UNITED STATES PATENT OFFICE.

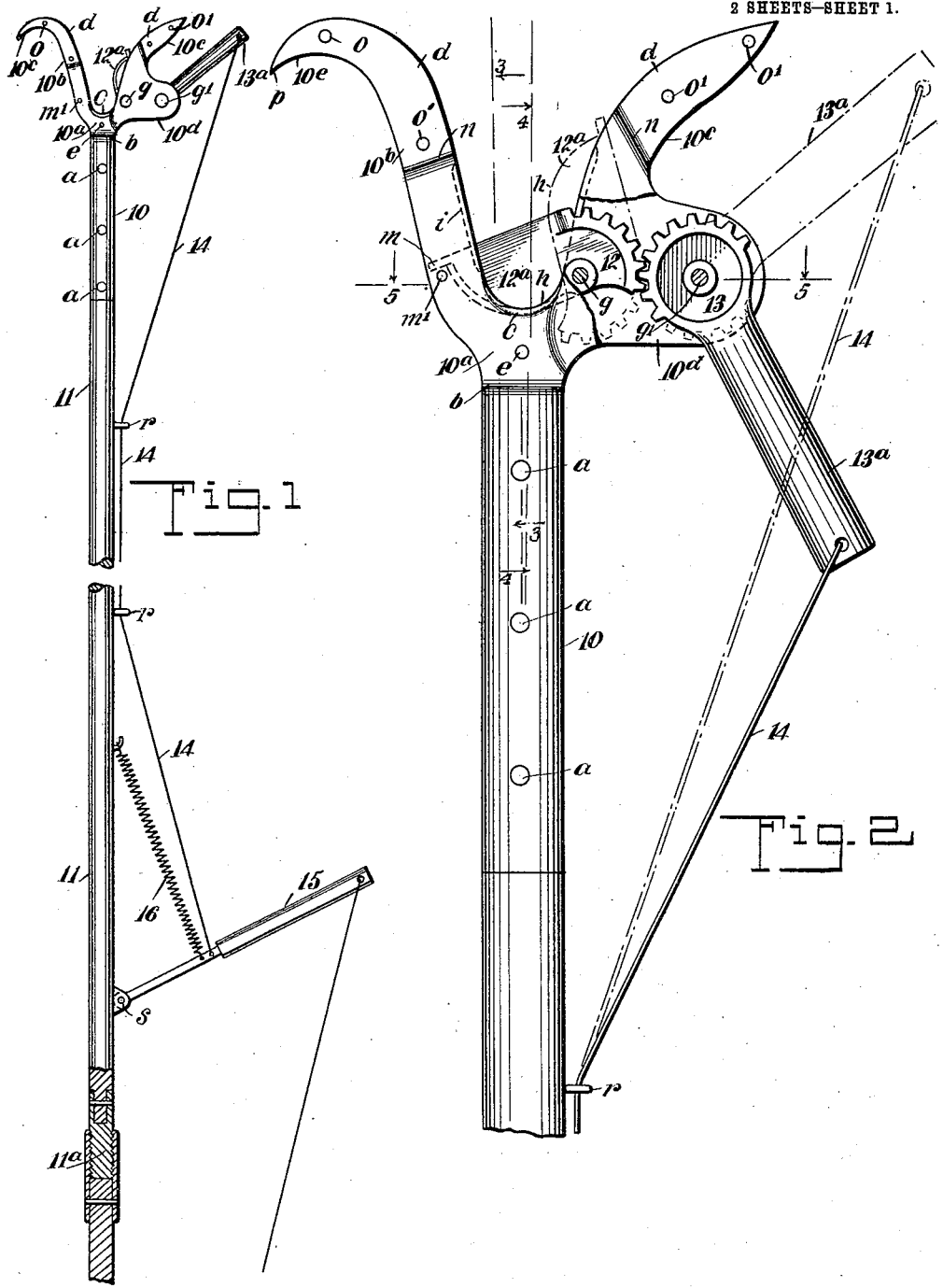

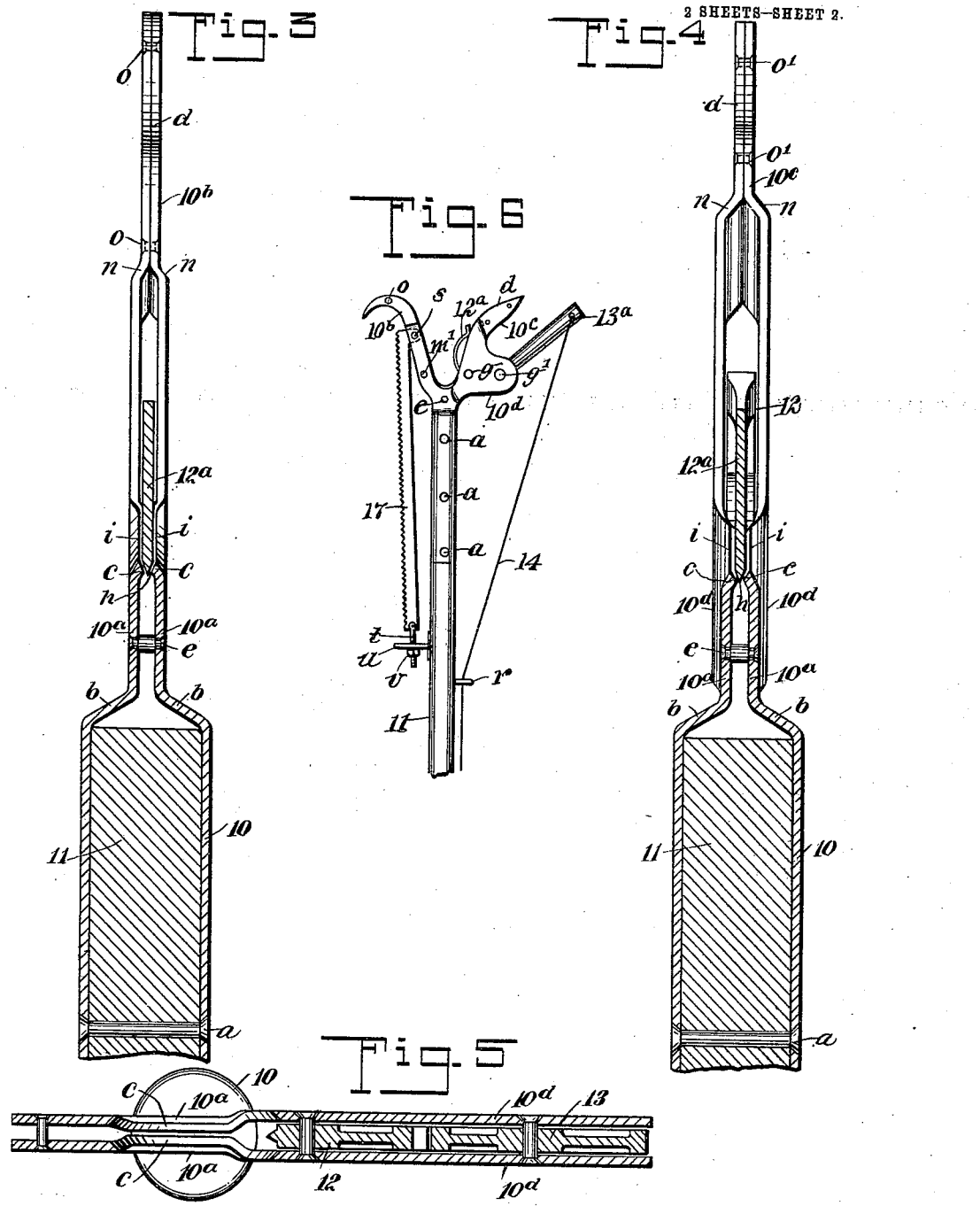

CHARLES MONROE TAYLOR, OF PARIS, KENTUCKY.

LINEMAN'S PRUNING IMPLEMENT.

988,153. Specification of Letters Patent. Patented Mar. 28, 1911.

Application filed July 23, 1909. Serial No. 509,151.

*To all whom it may concern:*

Be it known that I, CHARLES M. TAYLOR, a citizen of the United States, and a resident of Paris, in the county of Bourbon and State of Kentucky, have invented a new and Improved Lineman's Pruning Implement, of which the following is a full, clear, and exact description.

This invention relates to a class of pruning implements that are used in trimming trees and has for its object to provide an implement especially adapted to the use of linemen in keeping telegraph, telephone, electric light and trolley wires free from interference by limbs, etc., as well as in trimming trees generally, having novel features of construction that are remarkably efficient, simple, strong, light and durable, compactly associated, and that afford means for assembling with a single upward thrust several small limbs that are to be removed and cut said limbs smoothly and with the exertion of moderate manual effort; and a further object is to provide a saw attachable or detachable without the use of tools, for use in removing limbs that cannot be cut with the knife blade.

The invention consists in the novel construction and combination of parts, as is hereinafter described, and defined in the subjoined claims.

Reference is to be had to the accompanying drawings forming a part of this specification, in which similar characters of reference indicate corresponding parts in all the views.

Figure 1 is a side view of the improved implement, and of a reaching pole therefor, shown broken and partly in section;
Fig. 2 is an enlarged side view of the device, the parts shown in full and dotted lines representing two adjustments of the working parts thereof; Fig. 3 is a vertical transverse sectional view, substantially on the line 3—3 in Fig. 2, seen in the direction of the arrows; Fig. 4 is a similar view, taken substantially on the line 4—4 in Fig. 2, and seen in an opposite direction from that shown in Fig. 3; Fig. 5 is a sectional plan view of details, substantially on the line 5—5 in Fig. 2; and Fig. 6 is a view nearly similar to Fig. 1, but showing a saw blade attachment.

In the drawings, 10 indicates arms for attaching the implement on the upper end of a reaching pole 11, by cross pins $a$, or other means. From the upper end of the arms 10, two side walls $10^a$ are extended parallel with and inclined toward each other, the upper edges being sharpened, the space between side walls being less than the diameter of the arms at the lower part, so that in forming the wall $10^a$ opposite equal offsets $b$, $b$, are produced as shown in Figs. 3 and 4. At a suitable point $c$ about the offsets $b$, the side walls $10^a$ are each extended laterally upwardly and convexly outwardly approximately seven inches at the apex thus forming on each side two frame members $10^b$, $10^c$ that converge and at their lower ends are merged in the concave opposite edges $c$, which define the upper terminations of the side walls $10^a$. The concave edges $c$, incline toward each other, thus together providing an essentially caret ($\wedge$) or inverted V-shaped throat as is clearly shown in Figs. 3 and 4.

From the plate-like opposite frame members $10^c$, two similar exaggerated semi-elliptical plates $10^d$, project, and between the lower portions of the frame members $10^c$ and said projections $10^d$, a cutting blade with a quadrantal cutting edge on its inner and upward portion and a quadrantal meshing gear diametrically opposed to the cutting edges on its outward lower portion and a lever with a meshing gear of 120 degrees on one end, are inserted and pivoted respectively by means of the transverse pilot bolts $g$, and $g$, said blade having parallel sides and a thickness which adapts it to fit loosely between the concave edges $c$, when forced toward them, and having the lower part reinforced.

It will be noted that the cutter blade has a quadrantal cutting portion on its inner and upward portion, while on its outward and lower portion and diametrically opposed to the cutting edge a meshing gear is formed, the blade being pivoted near the edge farthest from the gear and on its lower axis, the cutting edge being adapted to pass into the crevice between the concave edges $c$, $c$, when the blade is operated so as to effect a cutting action of the blade as will be hereinafter more fully described.

The frame members $10^b$ toward which the cutter blade $12^a$ is forcibly revolved when in service, are spaced apart sufficiently above the side walls $10^a$, to freely permit the passage of said blade therebetween, and at their inner edges immediately above the edges $c$, said inner edges are widely flared so as to preclude the possibility of the cutting edge blade when sprung sidewise under the strain in cutting, striking or catching against the edge of the guides.

There is an abutment toe $m$ formed on the free end of the cutter blade $12^a$ and at a suitable point a transverse spacing pin $n$ is secured in the frame member $10^b$; said pin arresting the downward movement of the cutter blade, by an impingement of the toe $m$ thereon, this contact occurring when the curved edge $h$ of said cutter blade is seated between the cutting edges $c, c$.

The lever with gear segment 13, that is loosely inserted between the semi-elliptical projections $10^d$, and pivoted thereon by the transverse bolt $g$, stands, when not in operation, at an angle of approximately 30 degrees to the back of the blade and meshes with the quadrantal gear 12, and when forced downwardly traverses an arc representing approximately 120 degrees, causing the geared blade to traverse a similar arc.

At $n$ the upper portions of the frame members $10^b$, $10^c$ are in pairs offset toward each other, thus causing each pair to have lapped engagement, as shown in Figs. 3 and 4, rivets $o, o$, respectively, securing said upper portions together. As shown and hereinbefore stated, the frame members $10^b$, $10^c$, in pairs diverge from each other, thus providing a gathering fork, which converges toward the concave edges $c$. It will be noted in Figs. 1 and 2 that the upper portions $10^a$ of the connection frame members $10^b$ are tapered and curved outwardly and downwardly, forming a disengaging hook of approximately seven inches reach; also that the members are slightly spaced apart so that one end of a saw having a notch therein can be inserted between the members and attached to a rivet which serves as a pivot.

The reaching pole 11, may be of any convenient length, and, if preferred, may consist of sections joined together detachably, as shown in Fig. 1 at $11^a$. Upon the pole 11, at suitable points $r$, guides are mounted that loosely receive a rigid pusher rod 14, said rod at the upper end having a loose connection with the lever $13^a$ at its outer end. The pusher rod 14 at its lower end is loosely secured on a lever 15, at a point near the center of the latter and as shown in Fig. 1 at $s$, one end of said lever is pivoted upon the reaching pole 11, at a suitable distance from the ends of the latter. Between the respective levers and guide staples, anti-friction pulleys are placed at suitable points to reduce the strain on the guides, when the pusher rod is being operated.

A contractile spring 16 is attached by one end thereof upon the pole 11 above the lever 15, and at its lower end is secured upon said lever. It will be seen, that the contractile force of the spring 16 will normally raise the upper lever $13^a$ into the upwardly inclined position shown in Fig. 1 by full lines, and in Fig. 2 by broken lines. This adjustment of the lever $13^a$ will force the cutter blade $12^a$ upwardly as shown by dotted lines in Fig. 2, and in full lines in Fig. 1, the lower lever being correspondingly raised.

In service, the operator takes hold of the reaching pole 11, and thrusts the implement toward a limb that is to be trimmed by severance of an outer portion therefrom. The branch to be trimmed is introduced between the frame members $10^b$, $10^c$, and down past the elevated cutter blade $12^a$. The lower lever 15 is now pulled downward, which will cause the pushed rod 14 to depress the lever $13^a$, which will forcibly revolve the cutter blade $12^a$, downwardly.

It will be seen that the limb to be severed lies transversely in the concavity formed by the stationary cutting edges, $c, c$, and the quadrantal blade will sever the portion of the limb that is to be removed while the concave edges will co-act therewith and at the same time firmly support the limb and prevent it from splitting or the bark from stripping.

A feature of great advantage is afforded by providing a quadrantal cutting edge on the blade $12^a$ as in this shape of blade the minimum cut is required at each angle or degree of curvature while at the same time maximum power is being exerted; great advantage is also derived by cutting downward as the weight of the part severed aids in the work and prevents the blade from being clamped while it is cutting a limb.

The outward curvature and wide reach of the members of the gathering fork $10^b$, $10^c$, adapts the implement to readily engage any limb to be cut or in gathering several small limbs at a single upward thrust so that they may be cut at one operation, thus greatly expediting the pruning operation and avoiding labor on the part of the operative. The hook member $10^c$ affords means for engaging and removing limbs that have been severed and have become lodged or entangled with other limbs, wires, etc.

In Fig. 6, a saw attachment is shown combined with the cutting implement hereinbefore described consisting of a blade 17 having saw teeth on its outermost edge, said blade at its upper end having a notch that hooks over the rivet between the fork members $10^e$ of the main frame of the pruning device; on the lower end of the saw a straining rod is secured extending through a perforation in a post, the post having oblong holes in the base for inserting over raised screw heads on the reaching pole and the straining rod having a thumb nut for making the saw taut.

I claim:—

1. A lineman's pruner having a head formed of two steel plates with semi-elliptical projections on one outer edge of each plate, the plates riveted together near their upper ends, spaced apart intermediately and at their lower ends, adapted to be attached to a reaching pole, two stationary self-cleaning concave cutting blades, two arms extending upwardly and convexly outwardly forming a V or inverted bell-shaped assembling fork having an upward and horizontal reach at the apex of approximately seven inches and converging to about one and one-quarter inches at the lower extremity, one arm of said fork tapering from a width of approximately one and one-quarter inches at the bottom to one-quarter of an inch at the top, and the top curved downwardly to form a disengaging hook, the upper end of said hook having its members slightly spaced apart and a rivet serving as a pivot on which one end of a saw having a notch therein can be attached, the intermediate portion of the arm being looped to form a guide, the inward edges of the guide being widely flared, the other arms having exaggerated semi-elliptical projections on the outer edges, a downwardly revolving reinforced blade having a quadrantal cutting edge on its inner and upward portion and a segmental gear representing an arc of approximately 100 degrees diametrically opposed to the cutting edge, on its outer and lower portion, pivoted near its edge farthest from the operating lever and on its lower axis, perpendicularly, between the members of the arm, a lever having a segmental gear representing an arc of approximately 120 degrees and having the same pitch as the gear of cutting blade and meshing therewith, pivoted between the semi-elliptical projections on approximately parallel lines, the lever standing at an angle of approximately 30 degrees from the back of cutting blade when not in operation, and means for operating.

2. In a pruner having a head formed of two steel plates, with semi-elliptical projections on one outer edge of each plate, the plates riveted together near their upper ends, spaced apart intermediately and at their lower ends, adapted to be attached to a reaching pole, two stationary self-cleaning concave cutting blades, two arms extending upwardly and convexly outwardly forming a V or inverted bell-shaped assembling fork having an upward and horizontal reach at the apex of approximately seven inches and converging to about one and one-quarter inches at the lower extremity, one arm of said fork tapering from a width of approximately one and one-quarter inches at the bottom to one-quarter of an inch at the top, and the top curved downwardly to form a disengaging hook, the upper end of said hook having its members slightly spaced apart and a rivet serving as a pivot on which one end of a saw having a notch therein can be attached, the intermediate portion of the arm being looped to form a guide, the inward edges of the guide being widely flared, the other arms having exaggerated semi-elliptical projection on the outer edges, a downwardly revolving reinforced blade having a quadrantal cutting edge on its inner and upward portion and a segmental gear representing an arc of approximately 100 degrees diametrically opposed to the cutting edge, on its outer and lower portion, pivoted near its edge farthest from the operating lever and on its lower axis, perpendicularly, between the members of the arm, a lever having a segmental gear representing an arc of approximately 120 degrees and having the same pitch as the gear of cutting blade and meshing therewith, pivoted between the semi-elliptical projections on approximately parallel lines, the lever standing at an angle of approximately 30 degrees from the back of cutting blade when not in operation, and means for operating, antifriction pulleys on the reaching pole at suitable distances from the guides of pusher rod and connection of pusher rod with the levers.

3. In a pruner having a head formed of two steel plates with semi-elliptical projections on one outer edge of each plate, the plates riveted together near their upper ends, spaced apart intermediately and at their lower ends, adapted to be attached to a reaching pole, two stationary self-cleaning concave cutting blades, two arms extending upwardly and convexly outwardly forming a V or inverted bell-shaped assembling fork having an upward and horizontal reach at the apex of approximately seven inches and converging to about one and one-quarter inches at the lower extremity, one arm of said fork tapering from a width of approximately one and one-quarter inches at the bottom to one quarter of an inch at the top, and the top curved downwardly to form a disengaging hook, the upper end of said hook having its members slightly spaced apart and a rivet serving as a pivot on which one end of a saw having a notch therein can be attached, the intermediate portion of the arm being looped to form a guide, the inward edges of the guide being widely flared, the other arms having exaggerated semi-elliptical projections on the outer edges, a downwardly revolving reinforced blade having a quadrantal cutting edge on its inner and upward portion and a segmental gear representing an arc of approximately 100 degrees diametrically opposed to the cutting edge on its outer and lower portion, pivoted near its edge farthest from the operating lever and on its lower axis, perpendicularly, between the members of the arm, a lever having a segmental gear representing an arc of approximately 120 degrees and having the same pitch as the gear of cutting blade and meshing therewith, pivoted between the semi-elliptical projections on approximately parallel lines, the lever standing at an angle of approximately 30 degrees from the back of cutting blade when not in operation, and means for operating; the combination of a saw having a notch in one end of the blade for attaching to rivet in arm or pruner and the other end having a stud and post, the post having oblong holes for inserting over screws on reaching pole and thumb nut for making the saw taut.

4. A pruning implement comprising a socket having at one end arms curving outwardly from each other and forming a fork for receiving the article to be pruned, each of said arms having a transverse recess, a blade having a convex cutting edge pivoted in the recess of one of the arms, the edges of the other recess being sharpened to coöperate with the blade, means for moving said blade, a stop arranged transversely of the recess having the sharpened edges and a lug on the blade for engagement by the stop to limit the movement of the blade.

5. A pruning implement comprising a socket having at one end arms curving outwardly from each other and forming a fork for receiving the article to be pruned, each of said arms having a transverse recess, a blade having a convex cutting edge pivoted in the recess of one of the arms, the edges of the other recess being sharpened to coöperate with the blade, means for moving said blade, said means comprising a toothed segment integral with the blade and concentric with the axis upon which the blade swings, a lever pivoted to the adjacent arm and having a toothed segment coöperating with the segment of the blade for moving the same.

In testimony whereof I have signed my name to this specification in the presence of two subscribing witnesses.

CHARLES MONROE TAYLOR.

Witnesses:
  D. F. HINTON,
  ORLEY CHANDLER.

---

Copies of this patent may be obtained for five cents each, by addressing the "Commissioner of Patents, Washington, D. C."